(12) United States Patent
Wormald et al.

(10) Patent No.: US 9,266,024 B2
(45) Date of Patent: *Feb. 23, 2016

(54) IM CONTACT LIST ENTRY AS A GAME IN PROGRESS DESIGNATE

(75) Inventors: Christopher R. Wormald, Kitchener (CA); Gerhard Dietrich Klassen, Waterloo (CA); Ronald Scotte Zinn, Waterloo (CA); Samer Fahmy, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 632 days.

This patent is subject to a terminal disclaimer.

(21) Appl. No.: 13/615,361

(22) Filed: Sep. 13, 2012

(65) Prior Publication Data

US 2013/0007641 A1    Jan. 3, 2013

Related U.S. Application Data

(63) Continuation of application No. 12/962,405, filed on Dec. 7, 2010, now Pat. No. 8,677,250, which is a continuation of application No. 11/537,047, filed on Sep. 29, 2006, now Pat. No. 7,861,175.

(51) Int. Cl.
*G06F 3/048* (2013.01)
*A63F 13/30* (2014.01)
*G06Q 10/10* (2012.01)
(Continued)

(52) U.S. Cl.
CPC .............. *A63F 13/12* (2013.01); *G06Q 10/107* (2013.01); *G07F 17/3272* (2013.01); *A63F 2300/406* (2013.01); *A63F 2300/556* (2013.01); *A63F 2300/572* (2013.01); *G06F 3/048* (2013.01); *H04L 12/581* (2013.01); *H04L 12/582* (2013.01); *H04L 12/5815* (2013.01); *H04L 51/04* (2013.01); *H04L 51/043* (2013.01); *H04L 51/046* (2013.01)

(58) Field of Classification Search
CPC ..... H04L 51/04; H04L 51/043; H04L 51/046; H04L 12/581; H04L 12/5815; H04L 12/582; G06Q 10/107; A63F 2300/537; A63F 13/12; A63F 2300/572; A63F 2300/556; A63F 2300/046; G07F 17/3272; G06F 3/048
See application file for complete search history.

(56) References Cited

U.S. PATENT DOCUMENTS

| 5,971,849 | A | 10/1999 | Falciglia |
| 6,691,162 | B1 | 2/2004 | Wick |
| 6,699,125 | B2 | 3/2004 | Kirmse et al. |

(Continued)

FOREIGN PATENT DOCUMENTS

| EP | 1207651 A2 | 5/2002 |
| EP | 1475939 A1 | 11/2004 |

OTHER PUBLICATIONS

RFC 2778—A Model for Presence and Instant Messaging; The Internet Society; Feb. 2000; Available from http://www.faqs.org/rfcs/rfc2778.html.

(Continued)

*Primary Examiner* — Patrick Riegler
(74) *Attorney, Agent, or Firm* — Thomas Grzesik; Fleit Gibbons Gutman Bongini & Bianco P.L.

(57) ABSTRACT

A method and apparatus for using a contact-list entry of an IM contact-list interface to designate an IM game in progress to facilitate switching between an IM conversation and an IM game.

19 Claims, 10 Drawing Sheets

(51) Int. Cl.
*G07F 17/32* (2006.01)
*H04L 12/58* (2006.01)

(56) References Cited

U.S. PATENT DOCUMENTS

| | | | |
|---|---|---|---|
| 6,807,562 B1 | 10/2004 | Pennock et al. | |
| 6,981,223 B2 | 12/2005 | Becker et al. | |
| 7,056,217 B1 * | 6/2006 | Pelkey | A63F 13/12 463/25 |
| 7,240,093 B1 | 7/2007 | Danieli et al. | |
| 7,288,028 B2 | 10/2007 | Rodriquez et al. | |
| 7,311,608 B1 | 12/2007 | Danieli et al. | |
| 7,401,150 B2 | 7/2008 | Shea et al. | |
| 7,788,176 B2 | 8/2010 | Gupta et al. | |
| 8,037,139 B1 | 10/2011 | Fish et al. | |
| 8,116,439 B1 | 2/2012 | Runcie | |
| 2002/0086732 A1 * | 7/2002 | Kirmse et al. | 463/42 |
| 2002/0144273 A1 | 10/2002 | Reto | |
| 2002/0160838 A1 | 10/2002 | Kim | |
| 2003/0101343 A1 * | 5/2003 | Eaton et al. | 713/170 |
| 2003/0229722 A1 | 12/2003 | Beyda | |
| 2004/0059445 A1 | 3/2004 | Moore et al. | |
| 2004/0192440 A1 | 9/2004 | Evans et al. | |
| 2004/0198403 A1 * | 10/2004 | Pedersen et al. | 455/517 |
| 2004/0224772 A1 | 11/2004 | Canessa et al. | |
| 2004/0268263 A1 | 12/2004 | Van Dok et al. | |
| 2005/0026697 A1 | 2/2005 | Balahura et al. | |
| 2005/0064939 A1 | 3/2005 | McSheffrey et al. | |
| 2005/0166154 A1 | 7/2005 | Wilson et al. | |
| 2005/0181878 A1 * | 8/2005 | Danieli | A63F 13/12 463/42 |
| 2006/0036692 A1 | 2/2006 | Morinigo et al. | |
| 2006/0036703 A1 | 2/2006 | Fulmer et al. | |
| 2006/0053194 A1 | 3/2006 | Schneider et al. | |
| 2006/0053379 A1 | 3/2006 | Henderson et al. | |
| 2006/0068917 A1 * | 3/2006 | Snoddy et al. | 463/42 |
| 2006/0136584 A1 * | 6/2006 | Decker et al. | 709/224 |
| 2006/0178216 A1 | 8/2006 | Shea et al. | |
| 2006/0252548 A1 | 11/2006 | Sasaki et al. | |
| 2006/0258463 A1 | 11/2006 | Cugno et al. | |
| 2006/0287106 A1 * | 12/2006 | Jensen | A63F 13/12 463/42 |
| 2007/0005704 A1 | 1/2007 | Heron et al. | |
| 2007/0073823 A1 | 3/2007 | Cohen et al. | |
| 2007/0168448 A1 | 7/2007 | Garbow et al. | |
| 2007/0173325 A1 | 7/2007 | Shaw et al. | |
| 2007/0197283 A1 | 8/2007 | Hartwell | |
| 2007/0218997 A1 | 9/2007 | Cho | |
| 2007/0220091 A1 | 9/2007 | Wang et al. | |
| 2007/0226307 A1 | 9/2007 | Bae et al. | |
| 2007/0233785 A1 | 10/2007 | Abraham et al. | |
| 2007/0288627 A1 | 12/2007 | Abella et al. | |
| 2008/0034038 A1 | 2/2008 | Ciudad et al. | |
| 2008/0052759 A1 | 2/2008 | Kronlund et al. | |
| 2008/0077529 A1 | 3/2008 | Swanburg | |
| 2009/0138828 A1 * | 5/2009 | Schultz et al. | 715/853 |

OTHER PUBLICATIONS

Frey, R.; Search Report from corresponding European Application No. 06121569.5; search completed Apr. 18, 2007.

Non Final Office Action dated Feb. 26, 2015, received for U.S. Appl. No. 13/615,379.

* cited by examiner

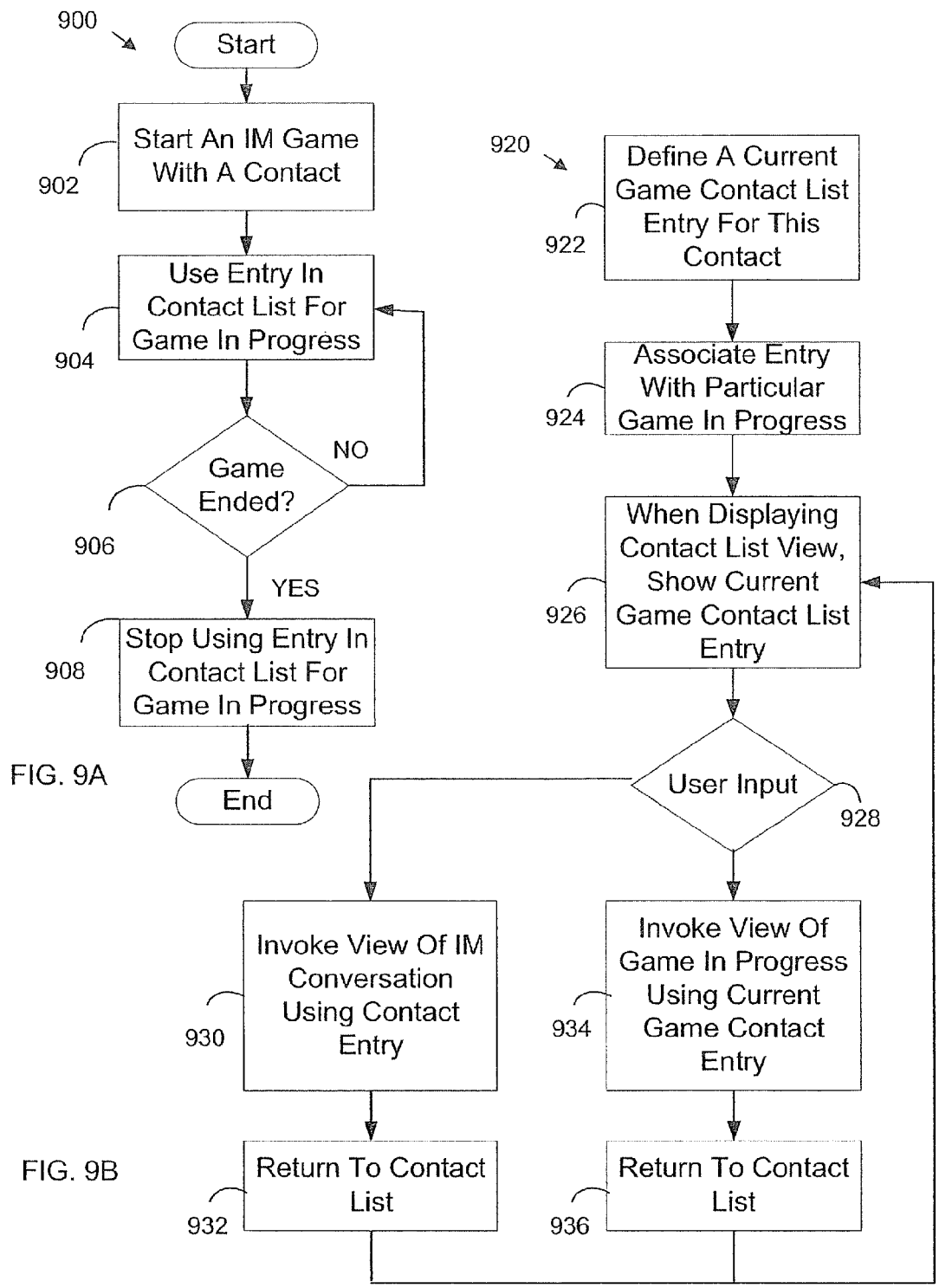

IM CONTACT LIST ENTRY AS A GAME IN PROGRESS DESIGNATE

CROSS-REFERENCE TO RELATED APPLICATIONS

This application is a continuation of U.S. patent application Ser. No. 12/962,405 filed on Dec. 7, 2012 which is a continuation of U.S. patent application Ser. No. 11/537,047 filed on Sep. 29, 2006, both of which are incorporated herein by reference.

FIELD OF THE INVENTION

The present application relates to a user interface for a messaging application and more particularly for a method and apparatus for using an IM contact list entry as a game in progress designate.

BACKGROUND OF THE INVENTION

Communication devices such as personal computers, wireless mobile telephones, personal data assistants, etc. often provide data communication abilities to users. One currently popular form of such communication is Instant Messaging (IM) facilitated by an application having a graphical user interface (GUI) whereby two or more users of different communication devices can engage in a conversational data communication exchange.

To permit IM message exchanges, a user may invite another to agree to receive IM messages and be included in the user's list of IM contacts (sometimes called an IM friend or buddy in view of the agreement to be a potential IM message recipient). The availability of the user or particular contacts for conversations may be maintained in accordance with respective presence information. To begin an IM conversation, a user selects a buddy represented by a contact list entry of a list of contacts and inputs a message. Additional contacts may be invited to engage in a group message, as desired. While IM messaging was originally directed to text, newer protocols support file transports and voice over data communications.

In addition to conducting conversations, an IM user may invite a buddy to engage in an on-line game where two (or more) players take turns during game play to compete against each other. Conventional board and card games such as checkers or poker may be adapted for IM game playing for example, among others. A game may be invoked via a game application interface or from within an IM application providing an interface to a game application.

A user may play more than one game at a time or play a game in a non-linear manner, leaving a game interface to perform other tasks such as email, calendar review, etc. Thus it is desirable to provide an interface to games in progress.

A solution to one or more of these needs is therefore desired.

BRIEF DESCRIPTION OF THE DRAWINGS

In order that the subject matter may be readily understood, embodiments are illustrated by way of examples in the accompanying drawings, in which:

FIGS. 9A to 9C are flow charts showing operations for using an IM contact list entry to designate a game in progress in a IM application in accordance with various embodiments.

DETAILED DESCRIPTION

Persons of ordinary skill in the art will appreciate that teachings herein are applicable to messages received via wired or wireless communication and though a wireless communication device and network including wireless communication capabilities are discussed in the examples, no limitations should be imposed. There is provided a method and apparatus for using a contact list entry of an IM contact list interface to designate an IM game in progress to facilitate switching between an IM conversation and an IM game.

Figure 1:
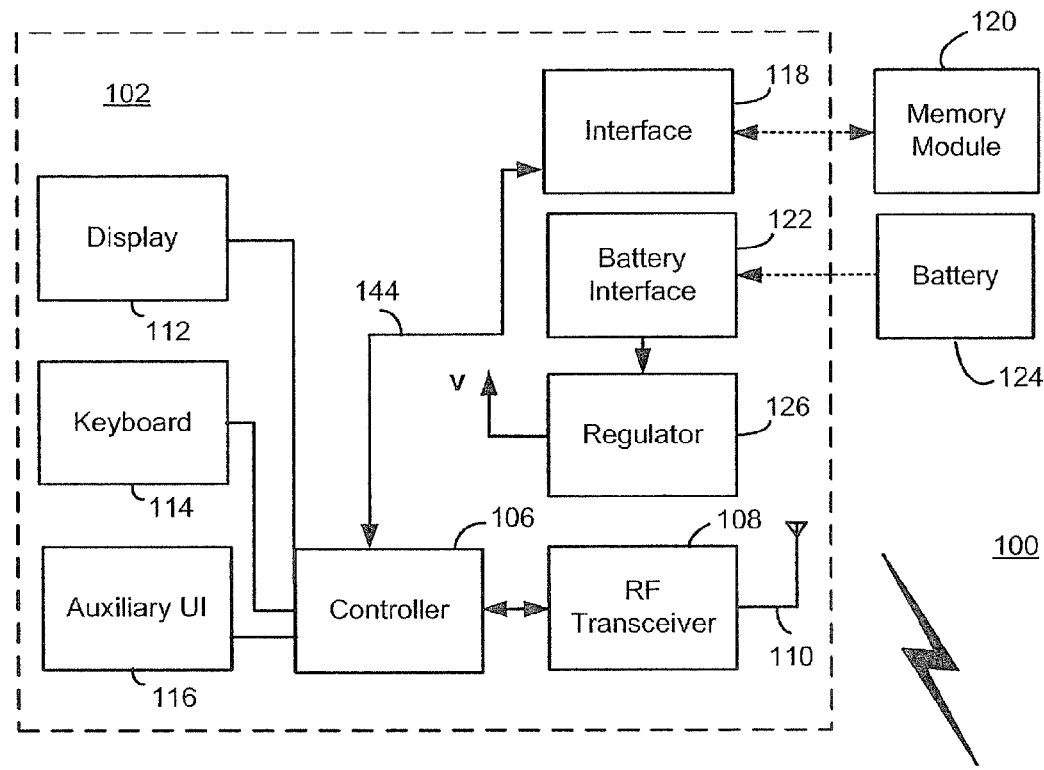
FIG. 1 is a block diagram which illustrates pertinent components of an example wireless communication network and a mobile station which communicates within this network.
Figure 1:
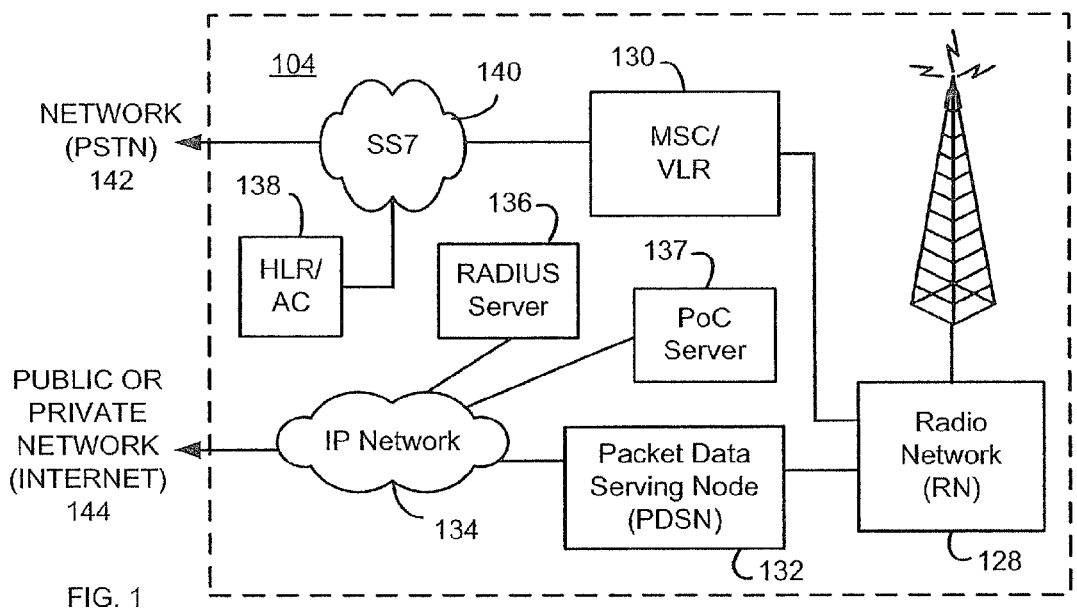

FIG. 1 is a block diagram of a communication system 100 which includes a mobile station 102 which communicates through a wireless communication network 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device. When mobile station 102 is fully operational, an RF transmitter of RF transceiver circuitry 108 is typically turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a memory module 120, such as a Subscriber Identity Module (SIM) or a Removable User Identity Module (R-UIM), which is connected to or inserted in mobile station 102 at an interface 118. As an alternative to a SIM or an R-UIM, mobile station 102 may operate based on configuration data programmed by a service provider into an internal memory which is a non-volatile memory. Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, and one or more auxiliary UIs 116, and controller 106 may remain within the radio modem unit that communicates with the computer's CPU or be embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. In the embodiment of FIG. 1, wireless network 104 is a Third Generation (3G) supported network based on Code Division Multiple Access (CDMA) technologies. In particular, wireless network 104 is a CDMA2000 network which includes fixed network components coupled as shown in FIG. 1. Wireless network 104 of the CDMA2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet). Persons of ordinary skill in the art will appreciate that other networks and associated topologies including GPRS, E-GPRS and UMTS radio networks, among many others, may be employed with the teachings herein.

During operation, mobile station 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile stations 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. Mobile station 102 is also authenticated on system access by HLR/AC 138. In order to provide packet data services to mobile station 102 in a CDMA2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Wireless communication network 104 also includes a Push-to-talk over Cellular (PoC) server 137 which may be coupled to IP network 134. PoC server 137 operates to facilitate PoC individual and group communication sessions between mobile stations within network 104. A conventional PoC communication session involves a session connection between end users of mobile stations, referred to as session "participants", who communicate one at a time in a half-duplex manner much like conventional walkie-talkies or two-way radios.

Those skilled in art will appreciate that wireless network 104 may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
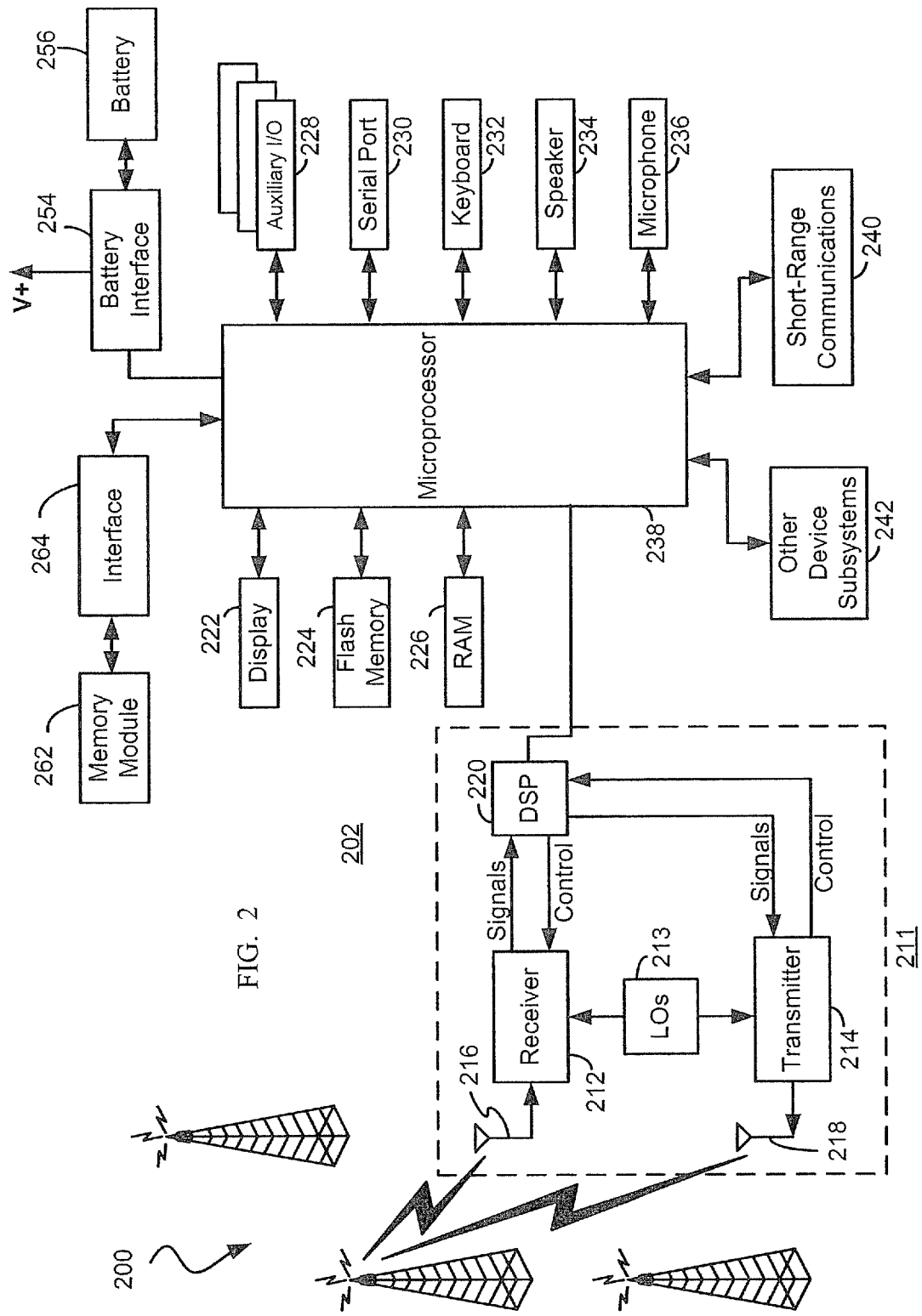
FIG. 2 is a more detailed diagram of the mobile station which may communicate within the wireless communication network.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Alternatively, memory module 262 may be a non-volatile memory which is programmed with configuration data by a service provider so that mobile station 202 may operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown in FIG. 2) which provides power V+ to all of the circuitry.

Mobile station 202 includes a microprocessor 238 (which is one implementation of controller 106 of FIG. 1) which controls overall operation of mobile station 202. This control includes network selection techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 262 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Mobile station 202 may be adapted to provide instant messaging (IM) communications via programming instructions and data stored or otherwise available to the device 202. Instant messaging provides a conversational dialog typically involving the exchange of text messages between a user of device 202 and at least one other user of another device (not shown) adapted for IM communication. As persons of ordinary skill in the art will appreciate, an IM system or "presence and instant messaging system" allows users to subscribe to each other and be notified of changes in state (e.g. availability for instant message communication) and for users to send each other short instant messages. IM is discussed in further detail in "RFC 2778—A Model for Presence and Instant Messaging", maintained by the Internet Society and available at http://www.faqs.org/rfcs/rfc2778.html. As such, adapted mobile station 202 provides a user agent for IM communication in an IM system.

Figure 10:
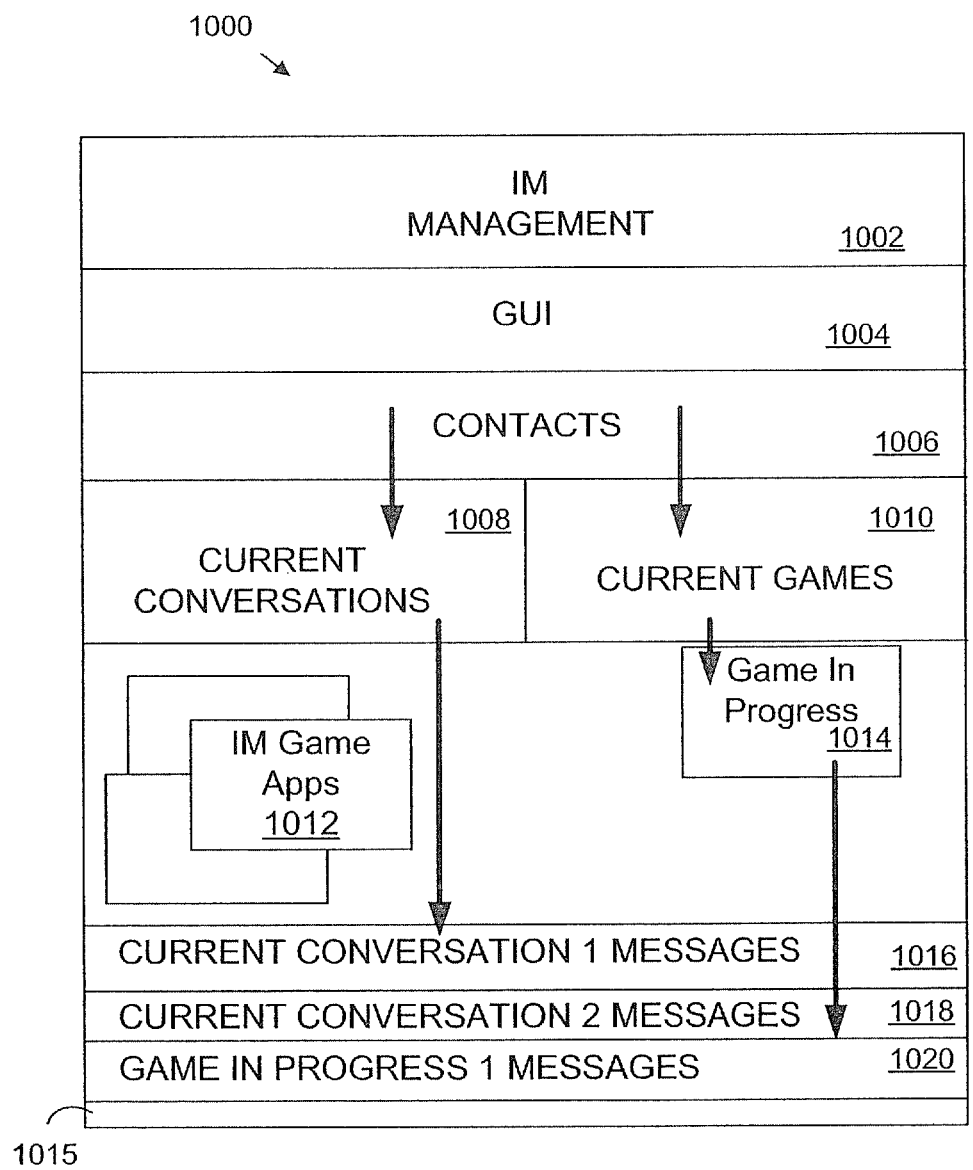
FIG. 10 is a block diagram of a portion of memory showing components of an IM application using an IM contact list entry to designate a game in progress in accordance with an embodiment.

FIG. 10 illustrates components 1000, typically comprising instructions and data that may be stored to flash memory 224 and/or RAM 226, for adapting station 202. Components 1000 comprise, broadly, IM management 1002, graphical user interface (GUI) 1004, contacts list 1006, contact list entries for current conversations 1008, contact list entries for current games 1010, IM game applications 1012, a game in progress 1014 and an IM Messages buffer 1015 comprising messages for current conversation 1 and 2 (1016 and 1018) and game in progress 1020. IM management component 1002 provides presence and IM communication functions for the user (e.g. a user having the name "Mike") of the mobile station 202. IM Messages may be communicated for text-based conversations with buddies or for other uses such as IM game applications 1012.

GUI 1004 provides support for a contact list-oriented interface for controlling aspects of the presence and IM functions using list of contacts 1006. Additional contact list entries include entries for current conversations 1006 and current games (i.e. a designate for a game in progress (1014) with another contact). Other contact list entries may include group entries for organizing individual contacts, and pending or unavailable contacts in accordance with presence information (not shown in FIG. 10).

IM Game applications 1012 provide specific turn-based game play for the user and one or more contacts. Some may be played alone against a notional user such as a computer. Game applications may be implemented in the Java™ language and receive support from a Java-oriented operating system on device 202. A particular game in progress may be represented by associated game-in-progress data 1014 for the game and associated game-in-progress messages 1020. An IM game application (e.g. one of 1012) may include a manner to invoke the application, initiating a GUI for the game and any necessary data, etc. for beginning a game. Game playing may be conducted and paused, as desired, such as by exiting the GUI for the game in favor of another GUI such as the GUI 1004. Game-in-progress data 1014 may be maintained to resume the game upon a re-invocation of the GUI for the game. Persons of ordinary skill in the art will appreciate that some game applications may support only one game in progress at any one time (i.e. not support multiple instances of game play of the same game). However, some may permit two or more games in progress.

In accordance with the present matter, a contact list entry may be defined to designate a game in progress. As such, the entry may be used by GUI 1004 to switch to GUI for a game application 1012 using game-in-progress data 1014 or to switch contexts such as from a IM message conversation context to a game in progress.

As will be understood to those of ordinary skill in the art, it is sometimes difficult to make bright-line distinctions between components such as, IM management and GUI components 1002 and 1004 or game-in-progress data 1014, gap application 1012 and game-in-progress messages 1020. As well, it is understood that the components 1000 interface with other components (not shown) on or for mobile station 202 such as operating system, communication sub-system, PIM components, etc.

Figure 3:
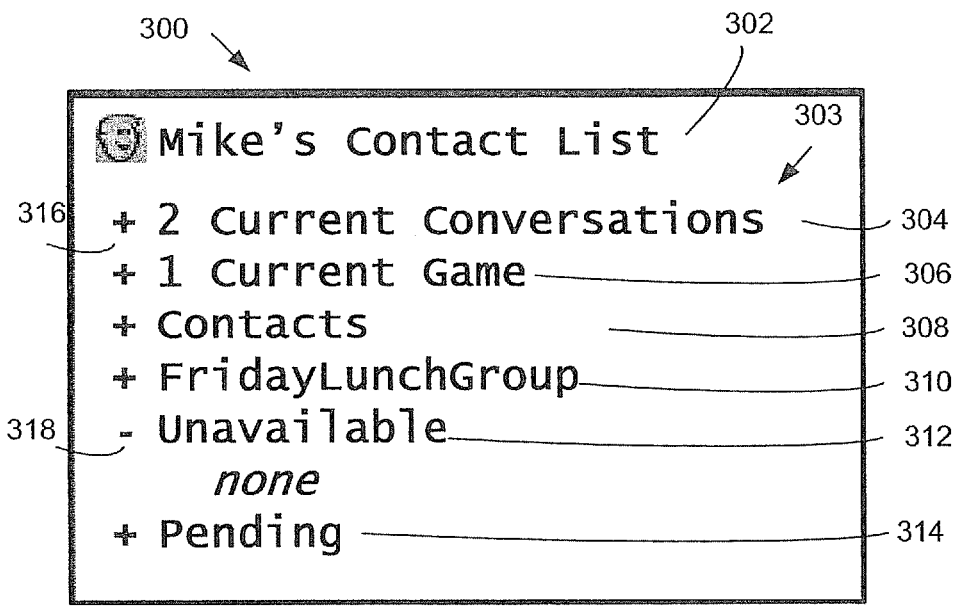
FIGS. 3 and 4 are representative GUI display views of an embodiment of an IM application showing an IM contact list entry to designate a game in progress.

FIG. 3 illustrates a representative view 300 of an IM screen provided by a GUI 1004 for an IM application 1002. The view 300 includes a title portion 302 showing "Mike's Contact List" and presents a contact list 303 interface comprising list entries, in particular, contact-list entries for current conversations 304, current games 306, individual contacts 308, a group of contacts 310, unavailable contacts 312 and pending contacts 314. It will be understood that view 300 provides a hierarchical list in a form which permits expansion and contraction of list items via elements 316 ("+") and 318 ("−"). Contacts may comprise individual user contacts 308 or group contacts 310 (e.g. FridayLunchGroup) for assisting with the organization of contacts within the IM application. Contacts may also be grouped by presence information. Contact group 312 comprises a list of those contacts which are presently unavailable for IM communications, while group 314 shows a list of those contacts who are pending the resolution of an invitation to join Mike's list of contacts in accordance with the subscription aspects of IM.

View 300 of Mike's Contacts may be traversed by a user by moving a focus about the view to interact with various elements of the GUI such as the expansion elements or individual items of the list. The focus may be indicated in various ways such as by reverse video mode, etc. Traversal or other navigation may be facilitated by input devices such as arrow keys, trackwheel, trackball, pointing device, etc. Once a particular element is selected by a user of the mobile station 202, particular command options may be invoked. Options may be presented via one or more menus or invoked through predefined keystrokes etc. common in the art.

FIG. 3 shows entry 304 of contact list 303 for designating current conversations that the user is conducting. In the present example, there are two current conversations with contacts "Rosa" and "StephanieB" shown in FIG. 4. In accordance with this embodiment, there is also shown contact list entry 306 for designating current games in progress that the user is conducting with a contact. In the present example, there is one current game in progress with contact "StephanieB" shown in FIG. 4.

Figure 4:
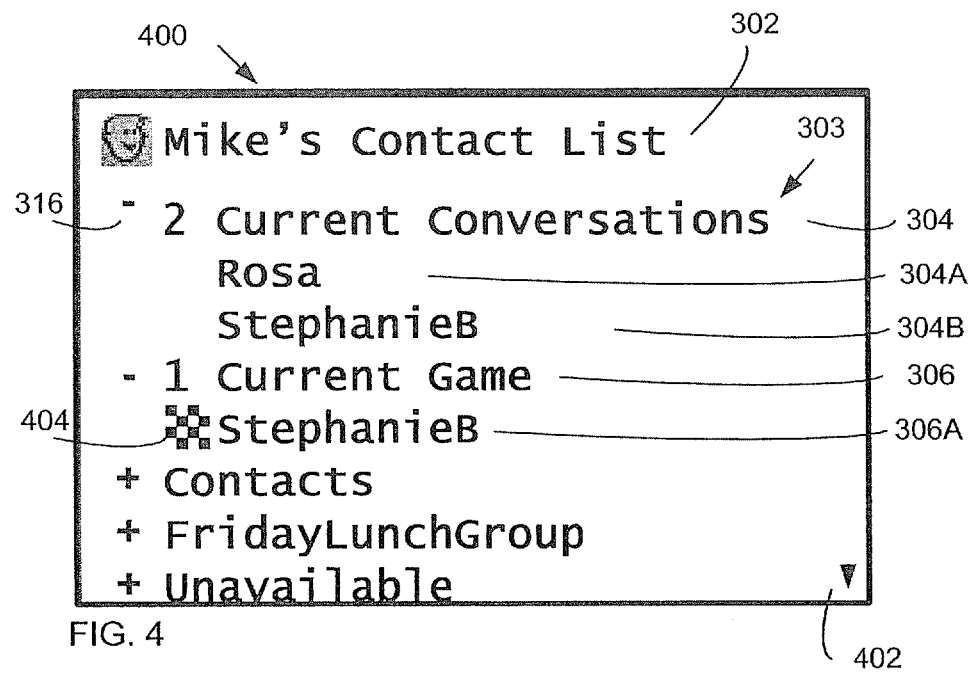

FIG. 4 illustrates a representative IM view 400 of contact list 303 in which the entries current conversations 304 and current games 306 are expanded to show individual list elements 304A-304B and 306A respectively for designating specific current conversations or games in progress. Navigational element 402 indicates that additional contact list entries or items appear off screen below. The entries in the contact list 303 may be navigated such as by moving the focus up and down the screen (not shown). Appropriate entries may be expanded or collapsed. Specific contacts may be selected and invoked to initiate an associated GUI.

Current conversation 304A designates a conversation with the contact "Rosa" while 304B designates a conversation with the contact "StephanieB". These respective contact-list elements 304A and 304B may be selected and activated (whether by a menu interface or by clicking an enter key for example) to invoke a view (e.g. 500 of FIG. 5) of GUI 1004 for conducting a conversation.

Current game list element 306A designates a current game in progress with a contact, namely "StephanieB", one of the contacts with whom the user is also in a current conversation. A person of ordinary skill in the art will appreciate that in many instances it will not be necessary or desired to have a current conversation and a game in progress active simultaneously with the same contact. A IM game may be conducted without conducting an associated IM text-based conversation with the contact.

This respective contact-list element 306A may be selected and activated (whether by a menu interface or by clicking an enter key for example) to invoke a view (e.g. 600 of FIG. 6) of a GUI for the respective IM game application 1012 for conducting the game in progress 1014.

View 400 further comprises an optional graphic element 404 for providing a visual metaphor for the game in progress, in this case a game of checkers.

Figure 5A:
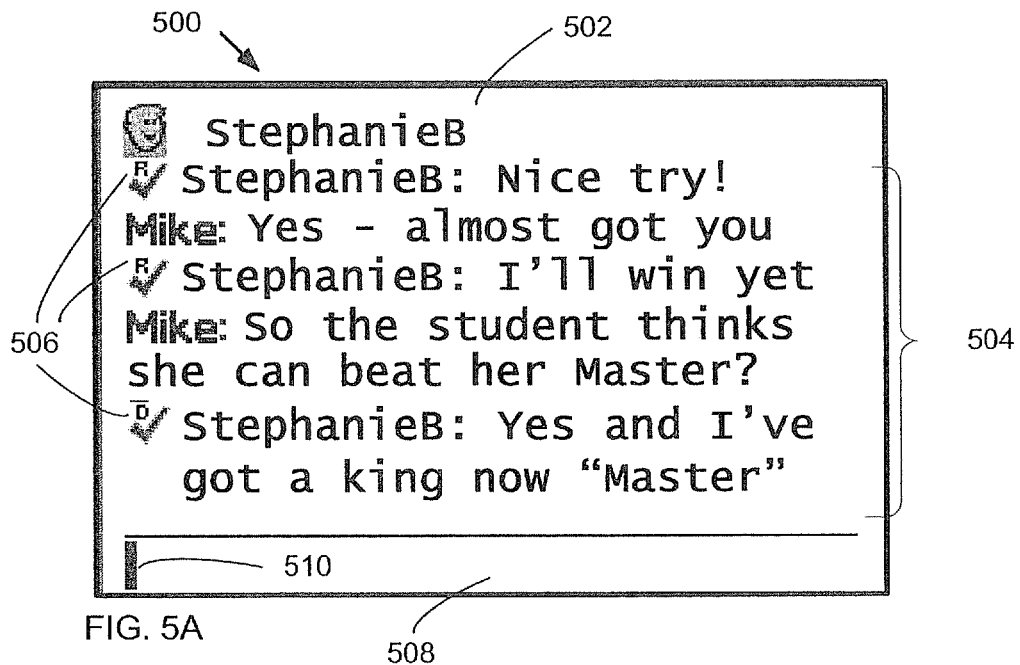
FIGS. 5A and 5B are representative GUI display views of embodiments of an IM application showing an IM conversation between game players for an IM application adapted to use an IM contact list entry to designate a game in progress.

FIG. 5A illustrates a representative IM view 500 of a current conversation with contact "StephanieB" and comprises a title portion 502 for indicating the contact and a message-history portion 504 for showing an exchange of messages and optional delivery and reply status 506 for the messages. A message-composition portion 508 with a cursor 510 is also provided with which to compose IM messages to the contact.

Figure 5B:
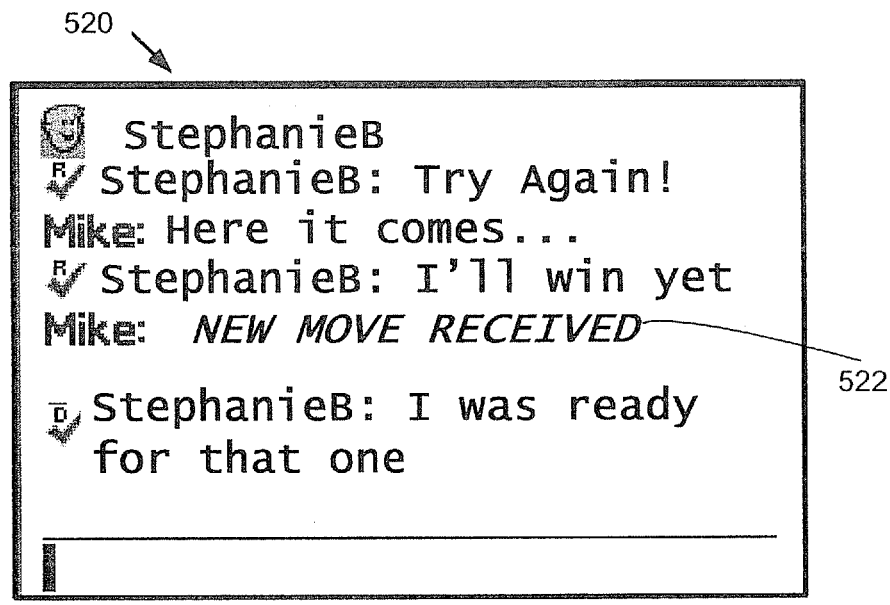

FIG. 5B illustrates a second representative IM view 520 of a current conversation interface with contact "StephanieB". As a new move is received from the contact in the associated game in progress, a notification of the new move 522 is presented in the conversation screen (e.g. portion 504) in a manner similar to how a new message is presented. The user may then select and open or switch (not shown) to the game in progress from the conversation interface 520.

Figure 6A:
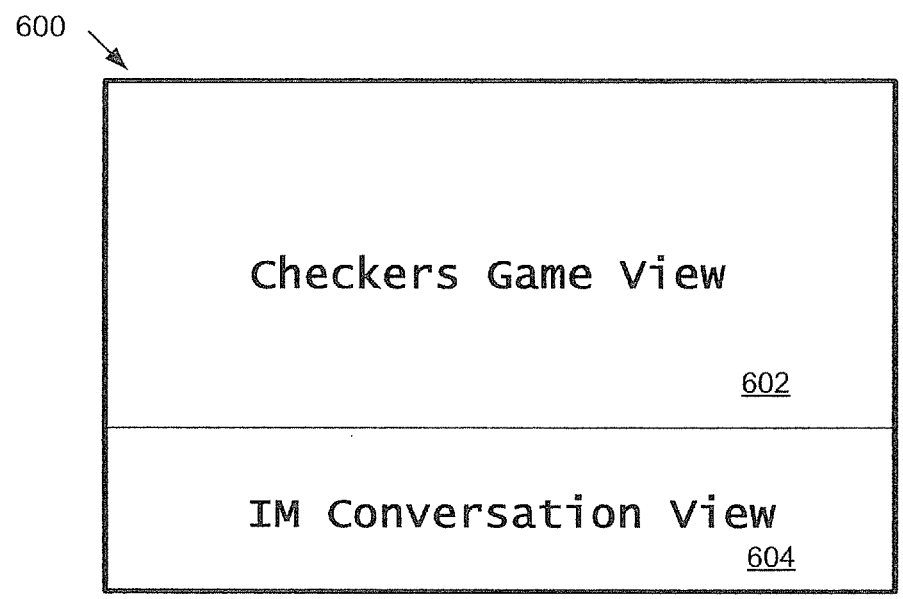
FIGS. 6A and 6B are representative GUI display views of embodiments of an IM game application showing IM conversation interfaces.

FIG. 6A shows a representative view 600 for a checkers game. In the present embodiment, a portion 602 of view 600 provides an IM game application interface to the game in progress, for example, visualizing the results of the game moves. Optionally, view 600 may comprise a portion 604 providing an interface to an IM conversation between the players. The portion 604 may be provided by IM GUI 1004. The portion 604 may comprise a field for entering IM messages, viewing IM messages (e.g. in a short list) or both. Alternatively (not shown), rather than dividing view 600 into distinct parts, IM conversation view portion 604 may be rendered over top of view 600 (e.g. to display new messages of an associated IM conversation for a limited period of time over game view 602).

Figure 6B:
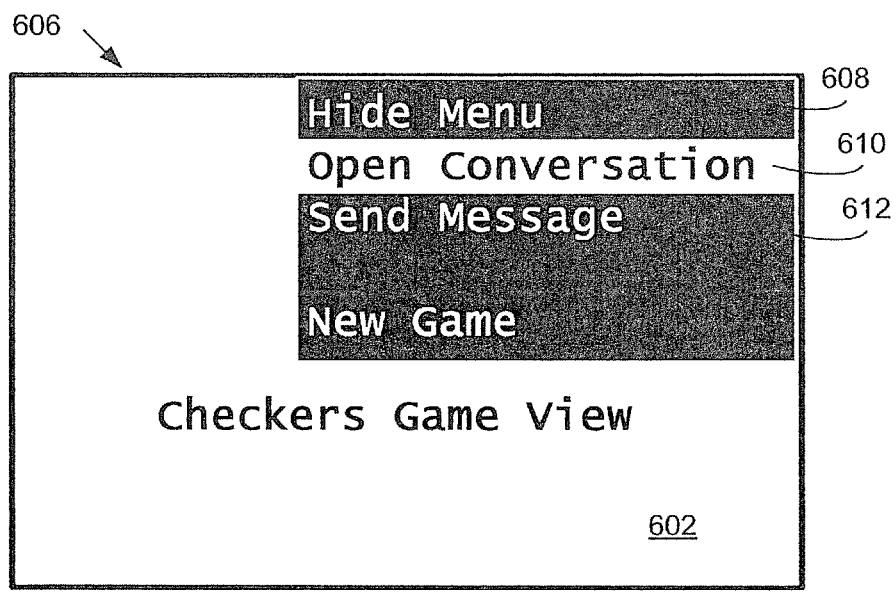

FIG. 6B illustrates a view 606 of a menu invocation manner for invoking a switch to an IM GUI to conduct a conversation with or send a message to an opposing player (or players). In the embodiment of view 606, an IM Conversation View portion 604 is not provided. A focus may be moved in menu 608 to select a command such as 610 to switch to a conversation screen (e.g. FIG. 5) or 612 to invoke a message input interface (not shown).

Figure 7A:
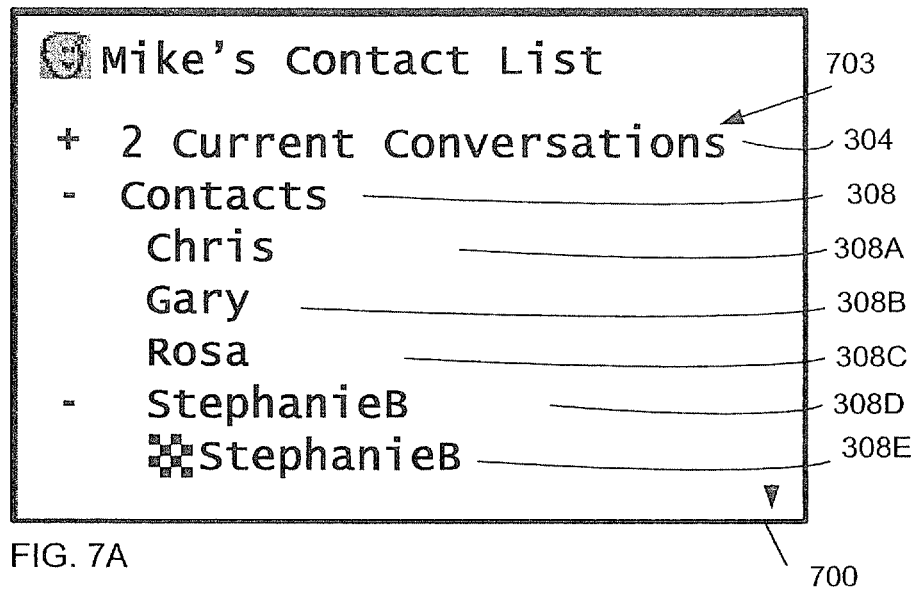
FIGS. 7A and 7B are representative GUI display views of further embodiments of an IM application adapted to use an IM contact list entry to designate a game in progress.

FIG. 7A shows a view 700 illustrating a further embodiment of a contact-list 703 for presenting contact list elements as designates of games in progress. In the present embodiment, a separate contact list element for grouping contacts for games currently in progress (e.g. element 306) is not provided. Rather, contacts designating games in progress are presented in the user's contacts element 308. Thus contact list 703 interface shows contacts element 308 expanded to present representative contacts 308A-308E. Similarly to contact element 306A of FIG. 4, contact element 308E of FIG. 7 designates a current game in progress with a contact, namely "StephanieB". This respective contact-list element 308E may be selected and activated (whether by a menu interface or by clicking an enter key for example) to invoke a view (e.g. 600 of FIG. 6) of a GUI for the respective IM game application 1012 for conducting the game in progress 1014. It is noted that aspects of the embodiment of FIG. 3 and FIG. 4 and the embodiment of FIG. 7 may be implemented such that a contact element designating a game in progress may be defined for presentation in a separate group of such contacts (element 306) and in the group of contacts (308) or otherwise (not shown), such as individually within the contact list.

Figure 7B:
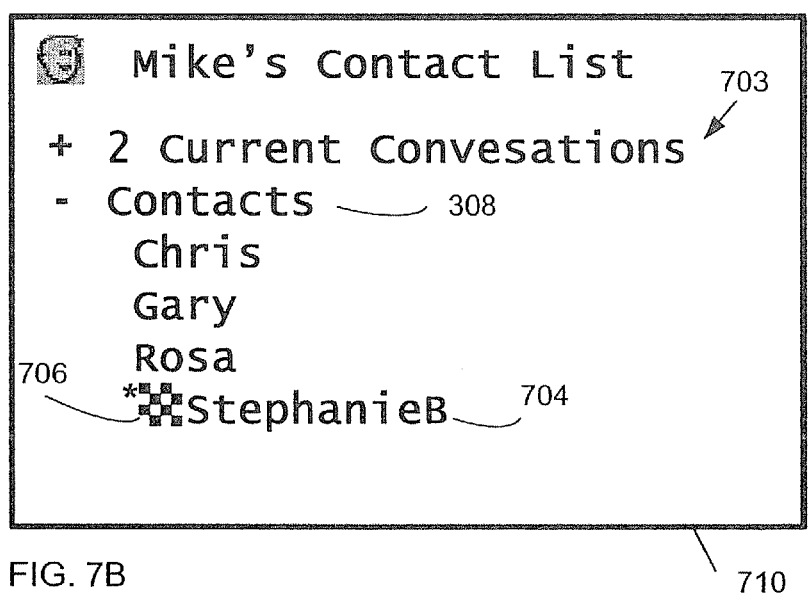

FIG. 7B illustrates a view 710 of contact list 703 depicting contacts 308 in an embodiment where a single individual contact element (e.g. 704) may represent a contact element for both IM conversation and IM game purposes rather than use separate elements (e.g. 308D and 308E of FIG. 7A). To indicate that an new or unread move exists in the associated game, graphical element 404 is amended (706). Other manners of indicating new moves may be employed such as by displaying a graphical element in title portion 302 or display contact 308 with the additional description "unread move", etc. Such an indication of new moves may also be used with the embodiment of FIG. 3-5.

Figure 8A:
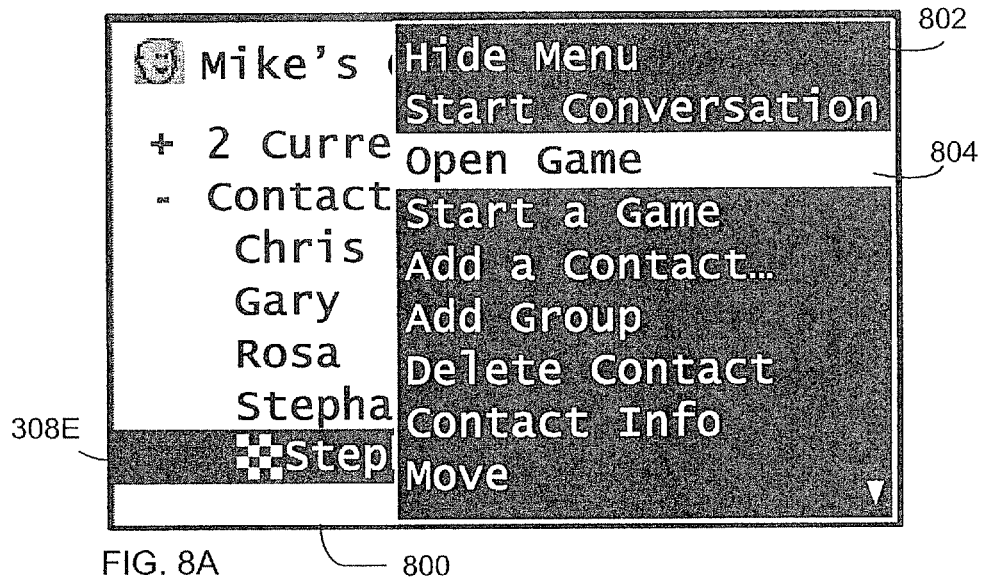
FIGS. 8A and 8B are representative GUI display views, in accordance with the respective embodiments of FIGS. 7A and 7B, showing menu interfaces.
Figure 8B:
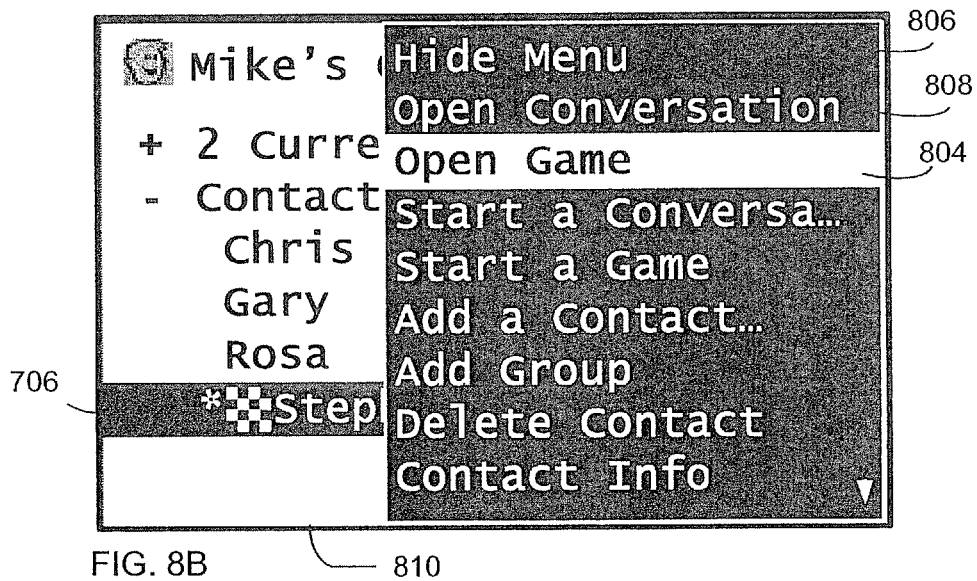

FIG. 8A illustrates a view 800 of a menu invocation manner for invoking a switch to a game GUI from the contact list GUI 1004 using the contact list of FIG. 7A as an example. A focus may be moved to a contact designating a game such as 308E and a menu 802 invoked to select a menu option 804 to open the game in progress 1014 (i.e. view 600) designated by the contact-list element 308E. FIG. 8B illustrates a view 810 of a menu invocation manner for invoking a switch to a game GUI from the contact list GUI 1004 using the contact list of FIG. 7B as an example. A focus may be moved to a contact designating a game and conversation such as 704 and a menu 806 invoked to select a menu option 804 to open the game in progress 1014 (i.e. view 600) designated by the contact-list element 704 or a menu option 806 to open the conversation in progress associated with the contact-list element 704, among other choices.

Other menu options (not shown) may include "open conversation" such as when a selected contact has an associated current conversation.

Figure 9C:
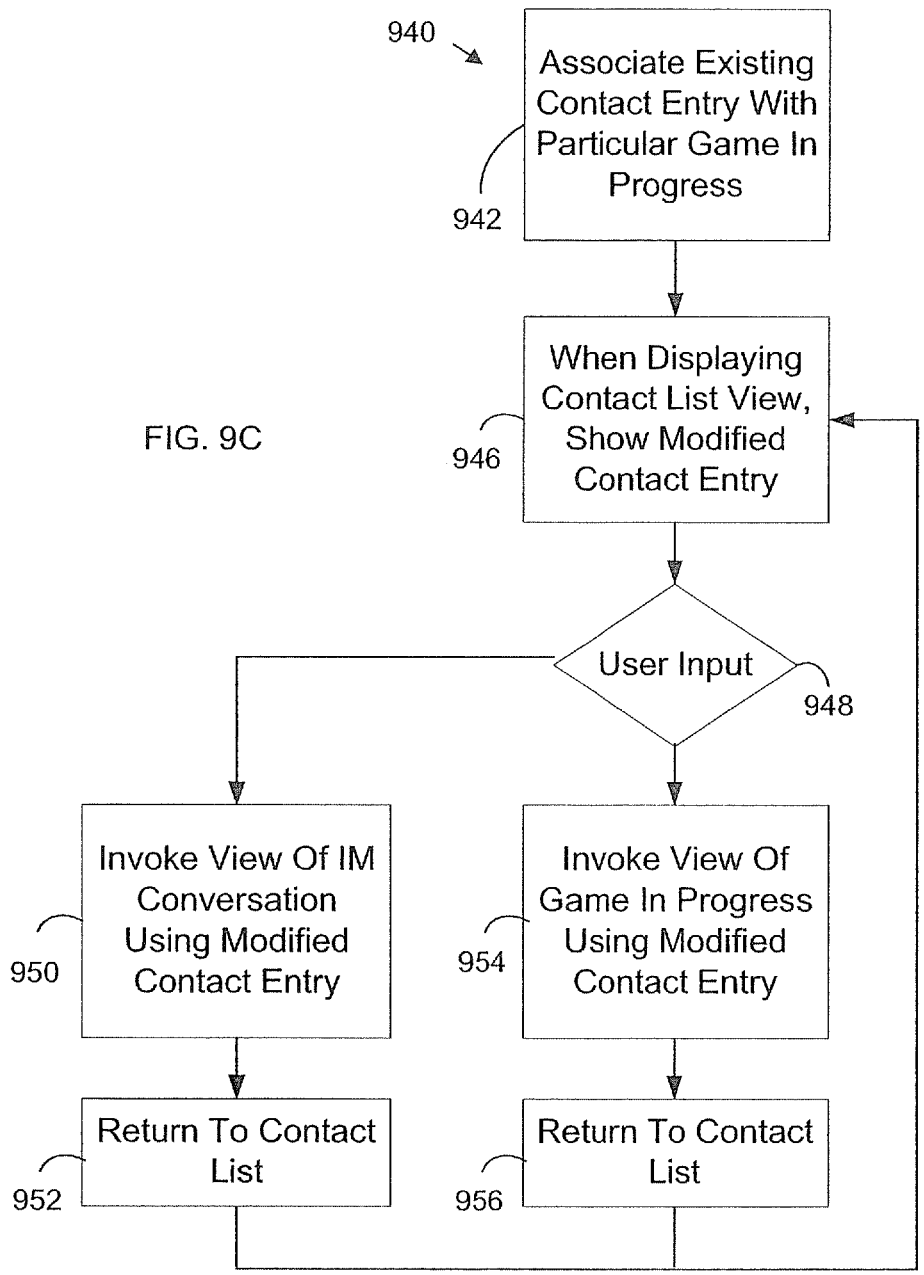

FIGS. 9A and 9B illustrate operations 900 and 920 of IM management 1002 for using an IM contact element as a designate for a game in progress, for example, to enable a convenient interface to switch between an IM conversation and an IM game.

Operations 900 provide a general overview of the use of a contact list element to designate a game in progress. In the example of FIG. 9A, the operations 900 represent steps for a first user to initiate a game with a second user. Persons of ordinary skill in the art will appreciate that similar operations (not shown) may be performed for the second user who partakes in the game initiated by the first user.

At step 902, a first user starts an IM game with a contact (i.e. the second user). The contact may be requested to download the IM game from a source (not shown). In accordance with presence information and subscription mechanisms, the contact may respond to the invitation. Similarly the user of device 202 (i.e. the first user) may accept an invitation.

At step 904, a contact list element, sometimes referenced as a buddy field or entry, is used to designate the game in progress. The entry may then be used in a GUI for managing and communicating with contacts to invoke a GUI for the associated game in progress. In one embodiment, such a contact list element may be defined for grouping as a current games contact. In one embodiment, such a contact list element may be defined for presentation with individual contacts useful for invoking conversations. As illustrated in FIGS. 4, 7A and 8A, the contact element (306A or 308E) designating the game may be illustrated separately and additionally to an existing contact element (e.g. 308D) for invoking a conversation with the second user. As illustrated in FIGS. 7B and 8B, an existing contact list entry (e.g. element 308D) may be used and associated with the game and a modified contact element 704 used to illustrate the game in progress and provide an interface to the game and a conversation from the contact list 703.

Upon the end of the game in progress (step 906), the use of the contact list element as a game-in-progress designate may be stopped (step 908). For example, element 308E may be removed from contact list 703 in the embodiment of FIGS. 7A and 8A, or elements 306 and 306A removed from the list 303 of FIG. 4 or an association with a game removed from a contact element and a modified contact element (e.g. 704) replaced with a standard contact element (e.g. 308D) in the embodiment of FIGS. 7B and 8B.

FIG. 9B illustrates operations 920 providing a simplified embodiment for conducting step 904 whereby a contact-list entry is created for grouping under a current-games contact group in a contact-list interface such as is shown in FIG. 3 and FIG. 4. To use a contact-list entry to designate a game in progress, a contact-list entry is defined (step 922) and associated with the contact with whom the game in progress is being played. Contact information may be determined from this contact's existing contact entry. The contact-list entry is also associated with the particular game in progress (e.g. via a pointer or table etc.) to facilitate the invocation of a GUI for the game. The contact entry may also include an association with a graphic for displaying with the contact entry designating the game.

When displaying the contact-list (i.e. when GUI 1004 is used by the user), the current game contact-list entry is shown in the current-game group of contacts in response to various user input (for example, navigation of the contact list interface and expansion of the current-games group element in that interface). The user may use the contact-list interface to invoke and conduct IM conversations (or continue to conduct an existing IM conversation) with the same contact with whom the user is playing the game or with another contact or contacts. The user may select and invoke the entry designating the game in progress. Other IM operations may also be performed (not shown).

Thus in response to certain pre-requisite user input such as menu driven commands or pre-determined keystrokes, etc. (step 928) operations 920 may branch to perform respective operations. In the simplified view, there are shown steps 930 and 932 for invoking a view of an IM conversation using a contract entry (e.g. an entry of a current conversation group) and returning to the contact list interface view at step 926 and steps 934 and 936 for invoking a view of the game in progress using an entry of the current-games group and returning to the contact list interface view at step 926. Persons of ordinary skill in the art will appreciate that further operations may be performed. Moreover, should an IM game end, operations 920 stop to continue via step 906.

Operations 940, similarly to operations 920, may be conducted for other embodiments such as that illustrated in FIG. 7B. Rather than define a current-game contact list entry, an existing contact entry for the opposing player (308D) may be used, associating that entry with the game in progress (step 942). When displaying the contact list view, a separate current-game contact entry (306) need not be used and the game-in-progress designate (e.g. 308D as replaced with 704) may be displayed with other contacts in contact list 308 (Step 946). In response to user input (step 948), the game in progress may be invoked at step 950 using the designate 704 or a conversation with the opposing player invoked (step 954) using the same designate 704. Operations return to the contact list (i.e. toward step 946) at respective steps 952 and 956.

Various storage schemes (e.g. linked lists) and memory allocation schemes for IM conversations 1016 1018 and game messages 1020 may be employed. Particular game messages may be linked to game-in-progress data 1014 and to a specific contact entry 1010 for designating a game in progress via pointers or other known techniques for associating one structure with another. Game progress may also be encapsulated into a binary IM message with an identifier to associate the binary data with the game application (not shown).

While discussed with reference to a handheld mobile device such as a smart PDA or smart phone, IM applications may be implemented on other computing devices such as personal computers (laptops, desktops), workstations and the like configured for network communications. IM applications and IM games are commercially available (e.g. AIM™ from AOL, Yahoo! Messenger™, MSN Messenger™, etc.) for many platforms such as PCs with various Windows®. or Windows compatible operating systems with sufficient memory and video capabilities. Additional software requirements may include an Internet browser and plug-ins and support for Java (e.g. JVM or plug-in support) as well as an available Internet connection.

The above-described embodiments are intended to be examples only. Those of skill in the art may effect alterations, modifications and variations to the particular embodiments without departing from the scope of the application. The subject matter described herein in the recited claims intends to cover and embrace all suitable changes in technology.

The invention claimed is:

1. A method comprising:
    displaying, in a screen for a mobile device, a game application interface for a game in progress;
    enabling game moves to be executed in the game application interface;
    enabling a command to be selected from a menu displayed in the screen to invoke a messaging interface for conducting an instant messaging conversation with an opposing player in the game in progress; and
    displaying the messaging interface in response to the command being selected, the messaging interface presenting a contact list to a user of the mobile device, the contact list comprising a set of contacts including the opposing player and a plurality of list items, wherein a first list item in the plurality of list items identifies a number of conversations between the user and the set of contacts, and a second list item in the plurality of list items identifies a number of games currently being played by the user, and
    wherein the messaging interface displays a graphical indicator designating the game in progress with the opposing player.

2. The method according to claim 1, further comprising providing a field for entering instant messages in the messaging interface.

3. The method according to claim 1, wherein the contact list is part of a conversation screen of the messaging interface, the conversation screen grouping contacts based on instant messaging conversations associated with the contacts.

4. The method according to claim 1, wherein the game application interface is associated with an instant message contact list entry in the contact list.

5. The method according to claim 1, further comprising presenting a notification of a new move for the game in progress in the game application interface.

6. The method according to claim 1, further comprising displaying new instant messages over top of the game application interface.

7. A non-transitory computer readable storage medium comprising computer executable instructions for:
    displaying in a screen for a mobile device, a game application interface for a game in progress;
    enabling game moves to be executed in the game application interface;
    enabling a command to be selected from a menu displayed in the screen to invoke a messaging interface for conducting an instant messaging conversation with an opposing player in the game in progress; and
    displaying the messaging interface in response to the command being selected, the messaging interface presenting a contact list to a user of the mobile device, the contact list comprising a set of contacts including the opposing player and a plurality of list items, wherein a first list item in the plurality of list items identifies a number of conversations between the user and the set of contacts, and a second list item in the plurality of list items identifies a number of games currently being played by the user, and
    wherein the messaging interface displays a graphical indicator designating the game in progress with the opposing player.

8. The non-transitory computer readable storage medium according to claim 7, further comprising instructions for providing a field for entering instant messages in the messaging interface.

9. The non-transitory computer readable storage medium according to claim 7, wherein the contact list is part of a conversation screen of the messaging interface, the conversation screen grouping contacts based on instant messaging conversations associated with the contacts.

10. The non-transitory computer readable storage medium according to claim 7, wherein the game application interface is associated with an instant message contact list entry in the contact list.

11. The non-transitory computer readable storage medium according to claim 7, further comprising instructions for presenting a notification of a new move for the game in progress in the game application interface.

12. The non-transitory computer readable storage medium according to claim 7, further comprising instructions for displaying new instant messages over top of the game application interface.

13. A mobile device comprising:
    a processor; and
    a memory, the memory storing computer executable instructions which when executed by the processor configure the processor to:
        display in a screen for a mobile device, a game application interface for a game in progress;
        enable game moves to be executed in the game application interface;
        enable a command to be selected from a menu displayed in the screen to invoke a messaging interface for conducting an instant messaging conversation with an opposing player in the game in progress; and
        display the messaging interface in response to the command being selected, the messaging interface presenting a contact list to a user of the mobile device, the contact list comprising a set of contacts including the opposing player and a plurality of list items, wherein a first list item in the plurality of list items identifies a number of conversations between the user and the set of contacts, and a second list item in the plurality of list items identifies a number of games currently being played by the user, and
        wherein the messaging interface displays a graphical indicator designating the game in progress with the opposing player.

14. The mobile device according to claim 13, wherein the memory further comprises instructions executable by the processor to provide a field for entering instant messages in the messaging interface.

15. The mobile device according to claim 13, wherein the contact list is part of a conversation screen of the messaging interface, the conversation screen grouping contacts based on instant messaging conversations associated with the contacts.

16. The mobile device according to claim 13, wherein the game application interface is associated with an instant message contact list entry in the contact list.

17. The mobile device according to claim 13, wherein the memory further comprises instructions executable by the processor to present a notification of a new move for the game in progress in the game application interface.

18. The mobile device according to claim 13, wherein the memory further comprises instructions executable by the processor to display new instant messages over top of the game application interface.

19. The method of claim 1, wherein at least one contact in the set of contacts is presented under at least one of the first list item, the second list item, or a combination thereof.

* * * * *